United States Patent
De Vries et al.

(10) Patent No.: US 9,382,025 B2
(45) Date of Patent: Jul. 5, 2016

(54) CONVEYING SYSTEM FOR TRANSPORTING, TRANSFERRING AND STAGING FOOD PRODUCTS

(71) Applicant: Marel Meat Processing Inc., Des Monies, IA (US)

(72) Inventors: Kevin De Vries, Monroe, IA (US); Kevin Hansen, Des Monies, IA (US)

(73) Assignee: Marel Meat Processing Inc., Des Moines, IA (US)

( * ) Notice: Subject to any disclaimer, the term of this patent is extended or adjusted under 35 U.S.C. 154(b) by 0 days.

(21) Appl. No.: 14/318,903

(22) Filed: Jun. 30, 2014

(65) Prior Publication Data

US 2015/0375881 A1 Dec. 31, 2015

(51) Int. Cl.
*B65G 47/10* (2006.01)
*B65G 47/46* (2006.01)
*B65B 35/56* (2006.01)
*B65G 37/00* (2006.01)
*B65G 43/08* (2006.01)
*B65G 47/52* (2006.01)
*B65G 47/53* (2006.01)

(52) U.S. Cl.
CPC ............. *B65B 35/56* (2013.01); *B65G 37/00* (2013.01); *B65G 43/08* (2013.01); *B65G 47/525* (2013.01); *B65G 47/53* (2013.01); *B65G 2201/0202* (2013.01)

(58) Field of Classification Search
CPC .................................................. B65G 47/084
USPC ............. 198/370.01, 370.02, 370.04, 370.07, 198/370.11, 380, 572, 575, 577, 579, 604, 198/605, 623, 636, 867.1, 867.11, 803.14, 198/890
See application file for complete search history.

(56) References Cited

U.S. PATENT DOCUMENTS

| | | | |
|---|---|---|---|
| 2,948,093 A | 8/1960 | Bonami | |
| 4,200,178 A * | 4/1980 | Gunti | B65G 47/54 198/367 |
| 4,262,792 A * | 4/1981 | Davies | B65G 37/00 198/348 |
| 4,633,652 A | 1/1987 | Dagenais et al. | |

(Continued)

FOREIGN PATENT DOCUMENTS

CH 702396 A2 6/2011
EP 0227254 A1 7/1987

(Continued)

*Primary Examiner* — Douglas Hess
(74) *Attorney, Agent, or Firm* — Zarley Law Firm, P.L.C.

(57) ABSTRACT

A conveying system for transporting a food product from an oven to a loading or packaging machine includes a transport conveyor system that has an input conveying belt and an output conveying belt that is parallel, driven at different speeds, and operatively mounted to a frame for transporting a food product. A plurality of displacement members are secured to the frame and positioned adjacent the input conveying belt. A sensor is located adjacent to a first end of the frame and adjacent to the input conveyor. Connected to the drives, the displacement members, and the sensor is a controller. The controller activates a selected displacement member based upon a sensed position of the food product as compared to a determined theoretical position of the food product to move the food product from the input belt to the output belt. The geometry of the belts on the transport conveyor allow the food product to self-center on the belt after the transfer. Positioned adjacent to an output conveying belt is a transport device for transporting food product from the output conveying belt to a discharge conveyor.

14 Claims, 11 Drawing Sheets

(56) References Cited

U.S. PATENT DOCUMENTS

| | | | |
|---|---|---|---|
| 5,057,055 A | 10/1991 | Michaud et al. | |
| 5,092,450 A | 3/1992 | Schommartz et al. | |
| 5,582,282 A * | 12/1996 | Focke | B65H 31/3054 198/347.1 |
| 5,868,239 A * | 2/1999 | Bonnet | B65G 47/844 198/370.01 |
| 6,005,211 A * | 12/1999 | Huang | B07C 3/02 198/370.06 |
| 6,152,289 A * | 11/2000 | Wark | B65G 47/525 198/370.11 |
| 6,332,749 B1 * | 12/2001 | Garcia-Balleza | B65G 47/52 198/464.3 |
| 6,634,483 B1 * | 10/2003 | Longoria | A21C 9/086 198/357 |
| 6,645,062 B1 * | 11/2003 | Buckles | A22C 11/0263 452/30 |
| 6,719,126 B2 * | 4/2004 | Badier | B65G 47/53 198/413 |
| 6,845,860 B1 * | 1/2005 | Walker | B65G 47/53 198/433 |
| 7,048,622 B2 * | 5/2006 | Shefet | A22C 11/008 452/32 |
| 7,258,604 B2 | 8/2007 | Reutter | |
| 7,571,800 B2 | 8/2009 | Hart et al. | |
| 8,025,142 B2 * | 9/2011 | Alexander | B65G 47/5122 198/370.08 |
| 8,418,831 B2 | 4/2013 | Alexander et al. | |
| 9,010,519 B2 * | 4/2015 | Handschick | B07C 5/122 198/395 |
| 2002/0084171 A1 | 7/2002 | Singleton et al. | |
| 2013/0277174 A1 | 10/2013 | Veldkamp et al. | |
| 2014/0014474 A1 | 1/2014 | Hart et al. | |

FOREIGN PATENT DOCUMENTS

| | | |
|---|---|---|
| JP | 2002338038 | 11/2002 |
| JP | 2011105438 | 6/2011 |
| WO | 9404417 | 3/1994 |
| WO | 2014111392 A1 | 7/2014 |

* cited by examiner

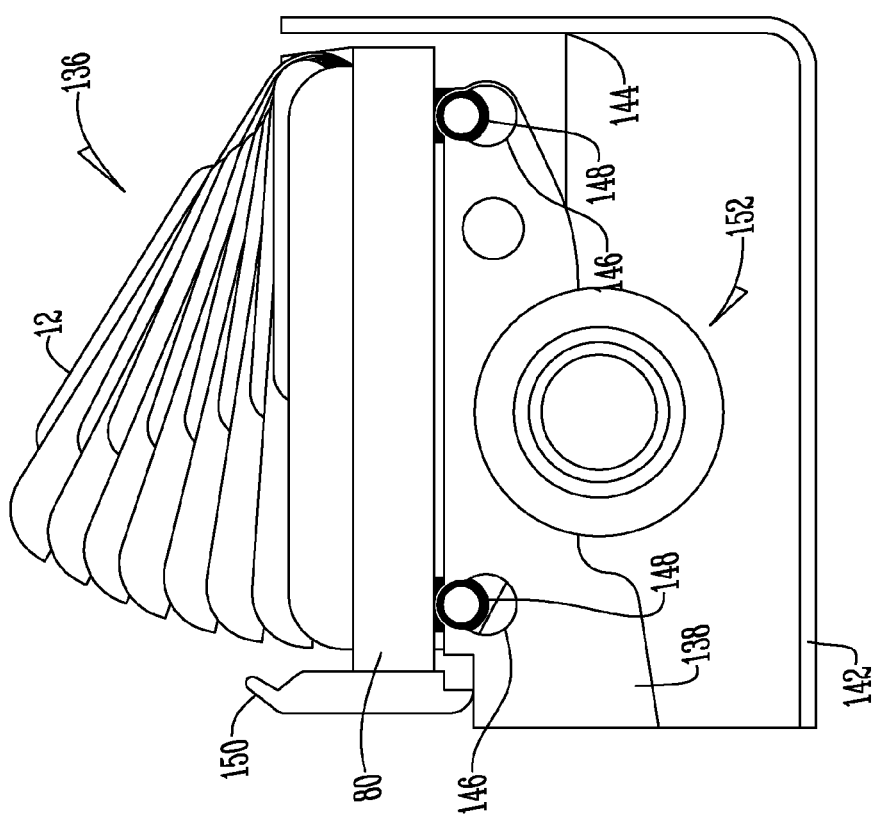

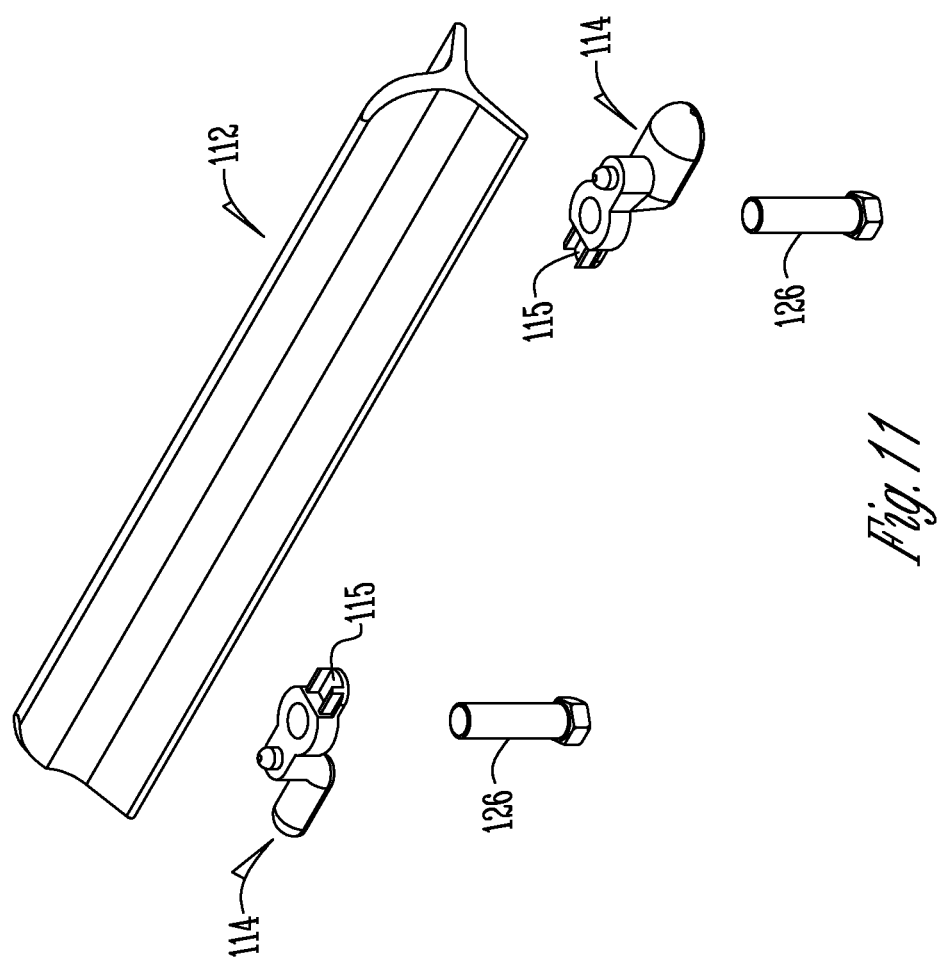

CONVEYING SYSTEM FOR TRANSPORTING, TRANSFERRING AND STAGING FOOD PRODUCTS

BACKGROUND OF THE INVENTION

This invention is directed to a conveyor and transfer system and more particularly to a system having a first conveyor that transports a food product in an end to end arrangement and then transfers the food product to a second conveyor where the food product is staged for packaging in a side-by-side arrangement.

Transporting food product to a loader is known in the art. Presently, when food products such as sausages or hotdogs are made and taken from an oven the product must be conveyed to a loader to be loaded into a packaging machine. For certain types of loaders the food product is conveyed in an end to end arrangement. With present systems, consecutive food products must have a minimum distance between them for proper transfer from an end to end to a side-by-side orientation. Product supply may be sporadic and must be corrected before entering the loading or packaging machine. Present systems use buffering or indexing to account for this.

High speed physical contact commonly damages fragile sausages. Handling performance is also adversely affected by inconsistent surface conditions of the sausage. Therefore, a need exists in the art for a conveyor system that addresses these deficiencies.

An objective of the present invention is to provide a food product handling system that delivers fragile products in an organized and consistent manner.

Another objective of the present invention is to convert irregular spacing of products to regular spacing for flow regulation without the use of accumulation or indexing.

Another objective of the present invention is to provide a transfer device where there is no physical contact with a food product when transferring it from an end to end orientation to a side-by-side orientation.

A still further objective of the present invention is to provide a conveying system with a reversible self-contained vibrating device.

An objective of the present invention is to provide flexibility in delivery to accommodate changing capacity demands such as multiple loading devices.

Another objective of the present invention is to provide a food product handling system that handles a range of sizes (both length & diameter) to a loading device in an organized and consistent manner without tooling changes.

These and other objectives will be apparent to one of ordinary skill in the art based upon the following written description, drawings and claims.

BRIEF SUMMARY OF THE INVENTION

A conveying system for transporting a food product from an oven to a loading or packaging machine includes a transport conveyor system that has an input conveying belt and an output conveying belt that is parallel, driven at different speeds, and operatively mounted to a frame. A plurality of displacement members are secured to the frame and positioned adjacent the input conveying belt. A sensor is located adjacent to a first end of the frame and adjacent to the input conveyor. Connected to the drives, the displacement members, and the sensor is a controller. The controller activates a selected displacement member based upon a sensed position of the food product as compared to a determined theoretical position of the food product to move the food product from the input belt to the output belt. The geometry of the belts on the transport conveyor allow the food product to self-center on the belt after the transfer.

Positioned adjacent the discharge end of the output conveyor belt is a transfer device. The transfer device has a controller that is mounted in a fashion that allows it to be adjusted along the output conveyor belt and supported by a frame. A sensor is mounted to the controller for detecting the presence of a food product on the output conveyor belt. Also, a fluid source, preferably an air jet, connected to a source of compressed air, is mounted to the controller and positioned adjacent the output conveyor belt. Upon detection of the food product, the controller activates the fluid nozzle to transfer the food product from the output conveying belt to a discharge conveying belt. The point of transfer is controlled by the transfer device's position and its settings.

The discharge conveyor, which is positioned transverse to the transport conveyor and transfer device, has a belt mounted on a plurality of pulleys. Connected to the belt using clips is a plurality of flights. The flights have a base, a primary finger that extends generally perpendicular from the belt, and a pair of secondary fingers that extend at an angle toward the belt. Further, the flights are positioned on the belt such that as the flights rotate about an arcuate section of the belt the primary fingers of adjacent flights separate to provide a wider opening to receive a food product and are drawn together when the flights move over a more straight section so that the food product is captured in a pocket between adjacent primary fingers and comes to rest centered on the secondary fingers in a predictable and consistent location. This location allows for a loading device to transport the sausages to a packaging machine. This configuration of belting may alternatively be molded with the flights described above.

BRIEF DESCRIPTION OF THE DRAWINGS

FIG. 10 is an end view of a discharge conveyor with a vibrating device; and

FIG. 11 is a perspective view of a flight and a clip.

DETAILED DESCRIPTION OF THE PREFERRED EMBODIMENT

Figure 1:
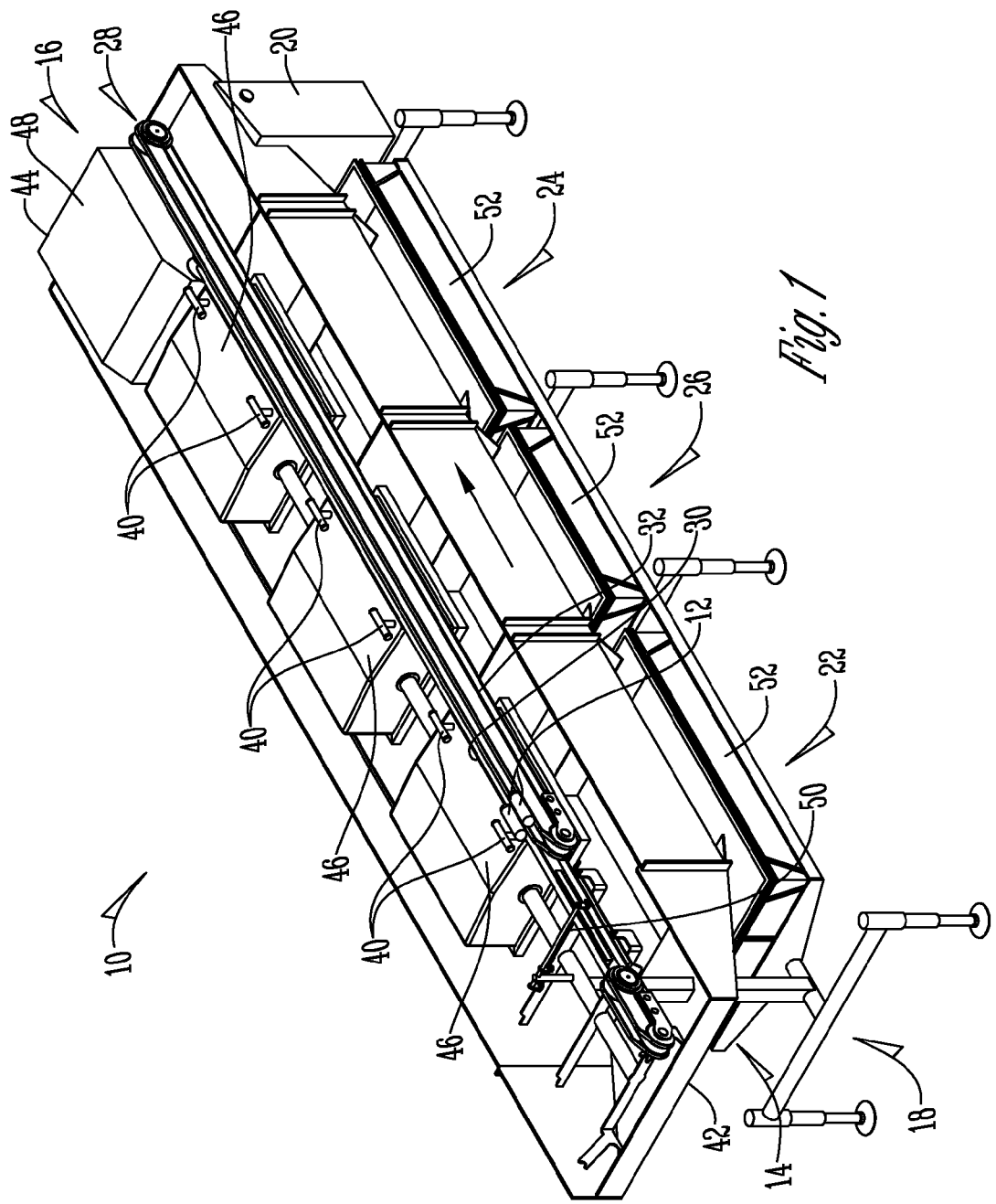
FIG. 1 is a perspective view of a transport conveyor system.
Figure 2:
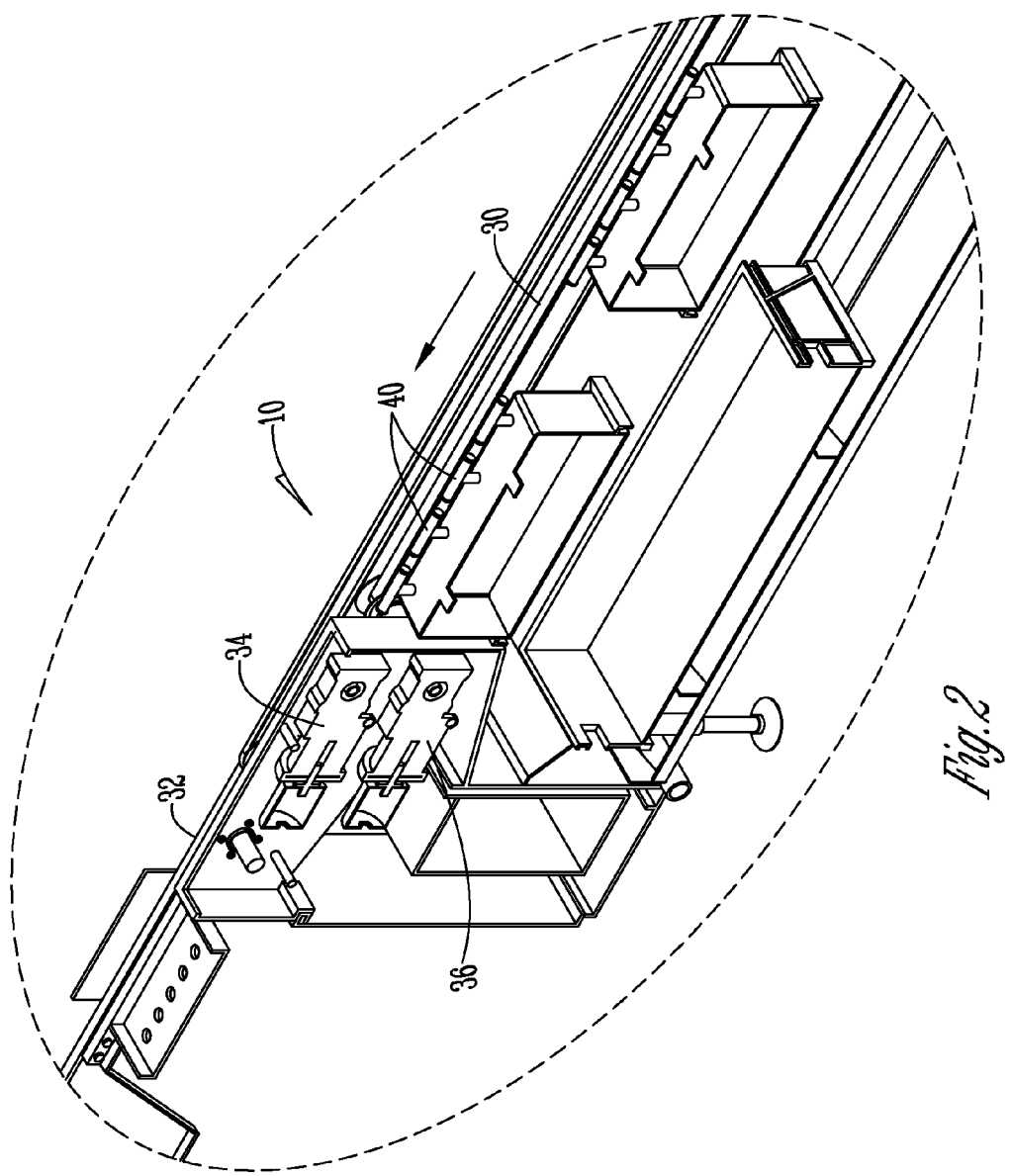
FIG. 2 is a sectional perspective view of a transport conveyor system.
Figure 3:
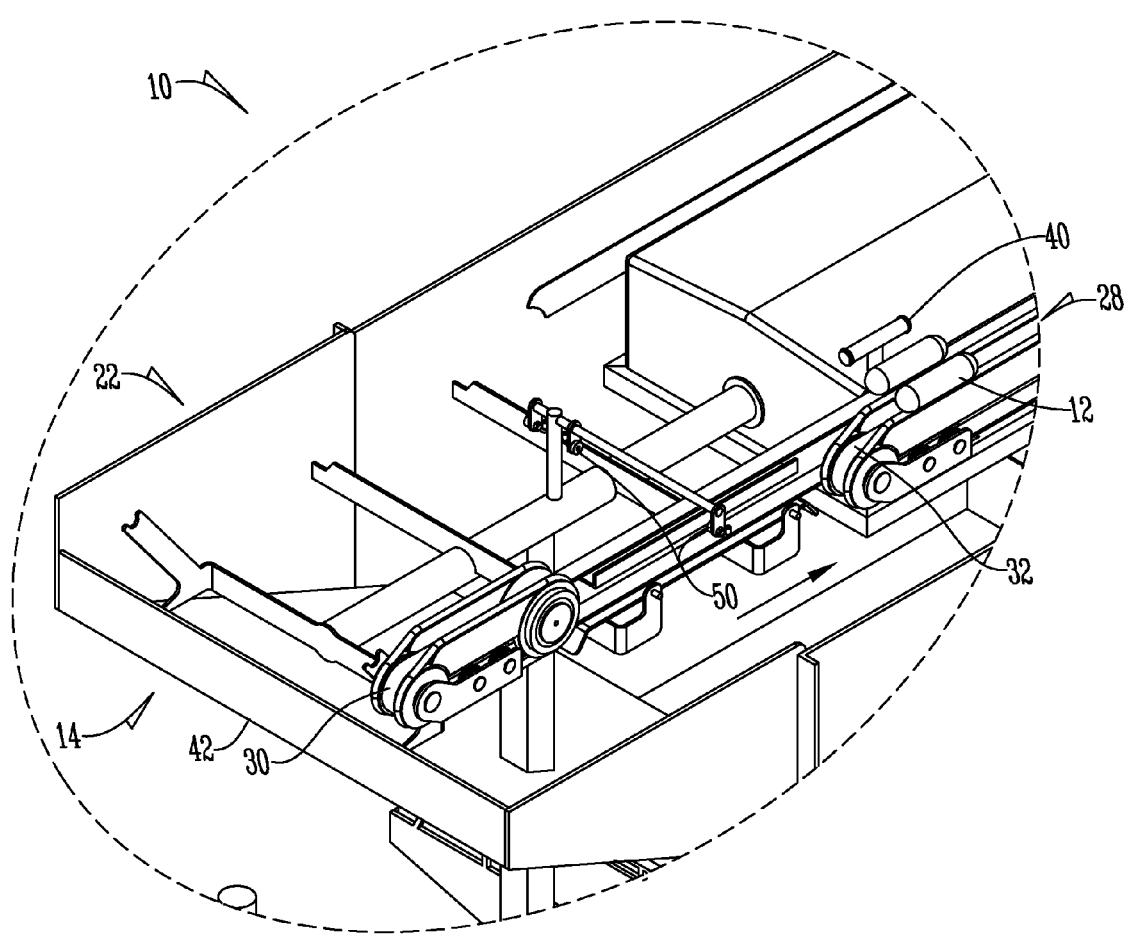
FIG. 3 is an enlarged perspective view of a portion of a transport conveyor system.

Referring to the Figures, and particularly in FIGS. 1-3, a transfer conveying system 10 used to convey a food or meat product 12 from a first location 14 to a second location 16 includes a frame 18 that houses a control unit 20. Alternatively, the control unit 20 is located at a loader or other remote location. Preferably, the frame 18 has an input module 22 and an output module 24 and intermediate modules 26 may be added between the input module 22 and output module 24 to increase the capabilities of the conveying system 10 as desired. The food product 12 is of any type such as a sausage, hot dog, piece of beef, pork, veal or the like.

Figure 5:
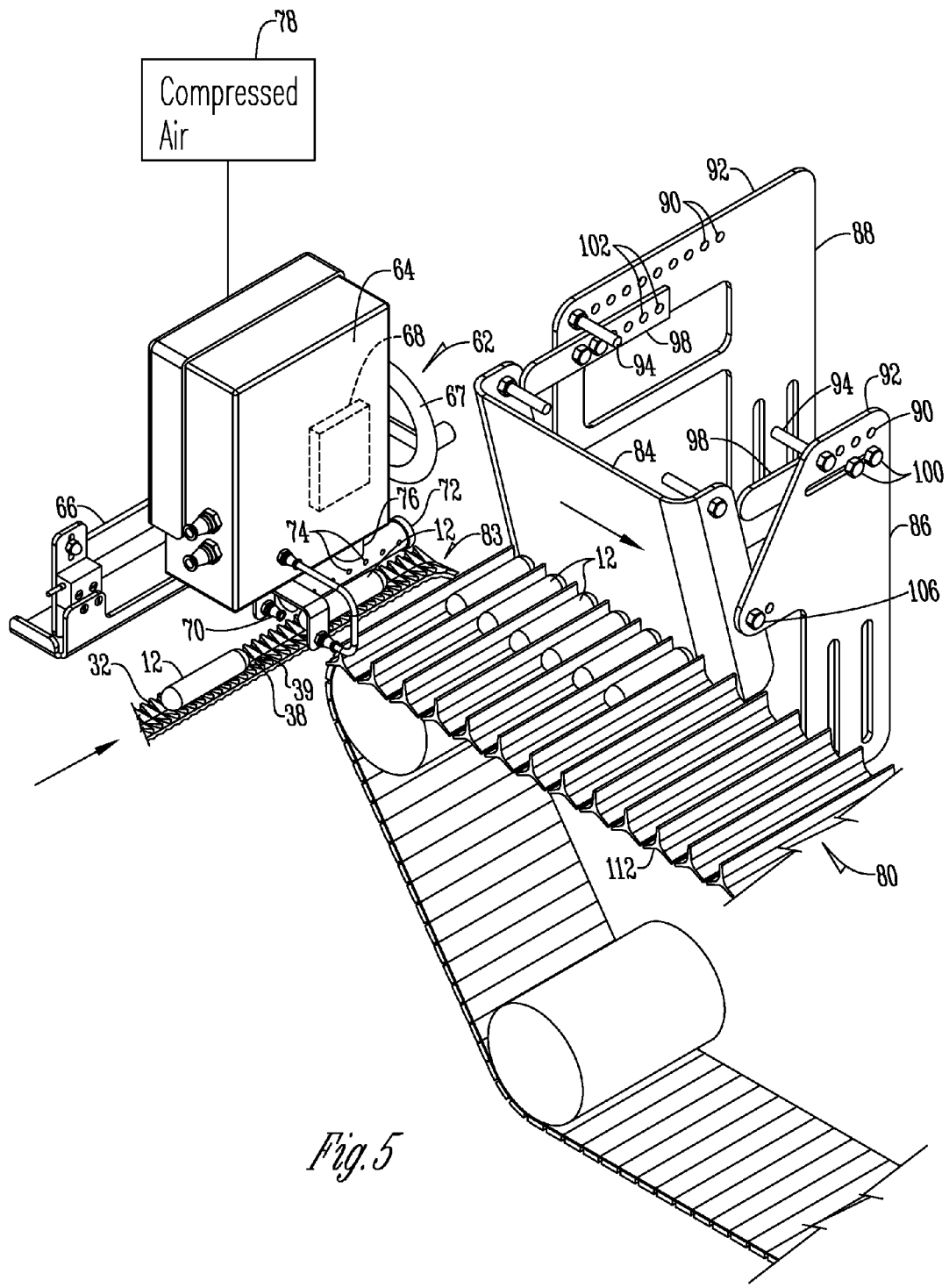
FIG. 5 is a perspective view of a transfer device and a portion of a discharge conveyor.
Figure 6:
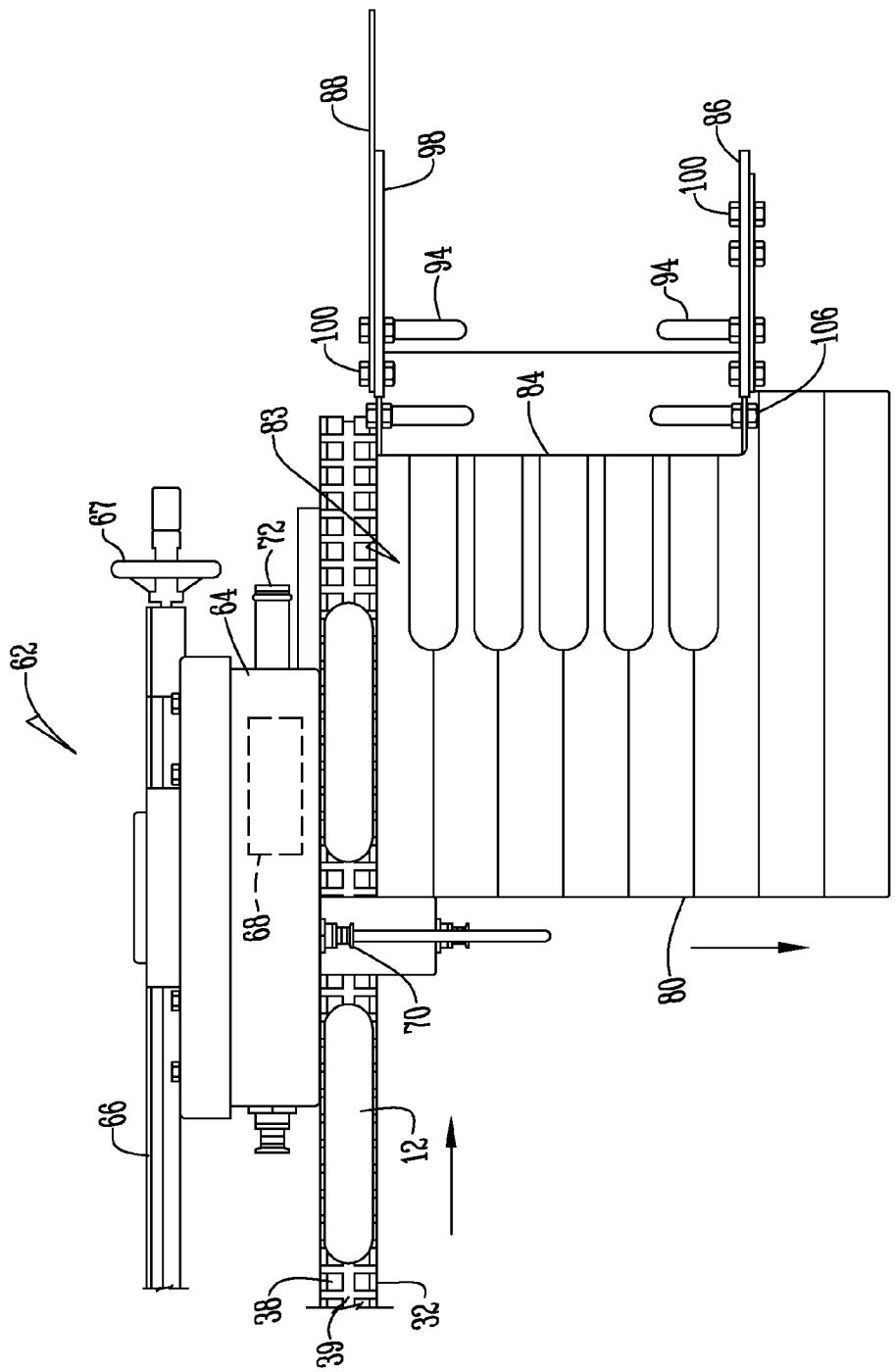
FIG. 6 is a top plan view of a transfer device and a portion of a discharge conveyor.
Figure 7:
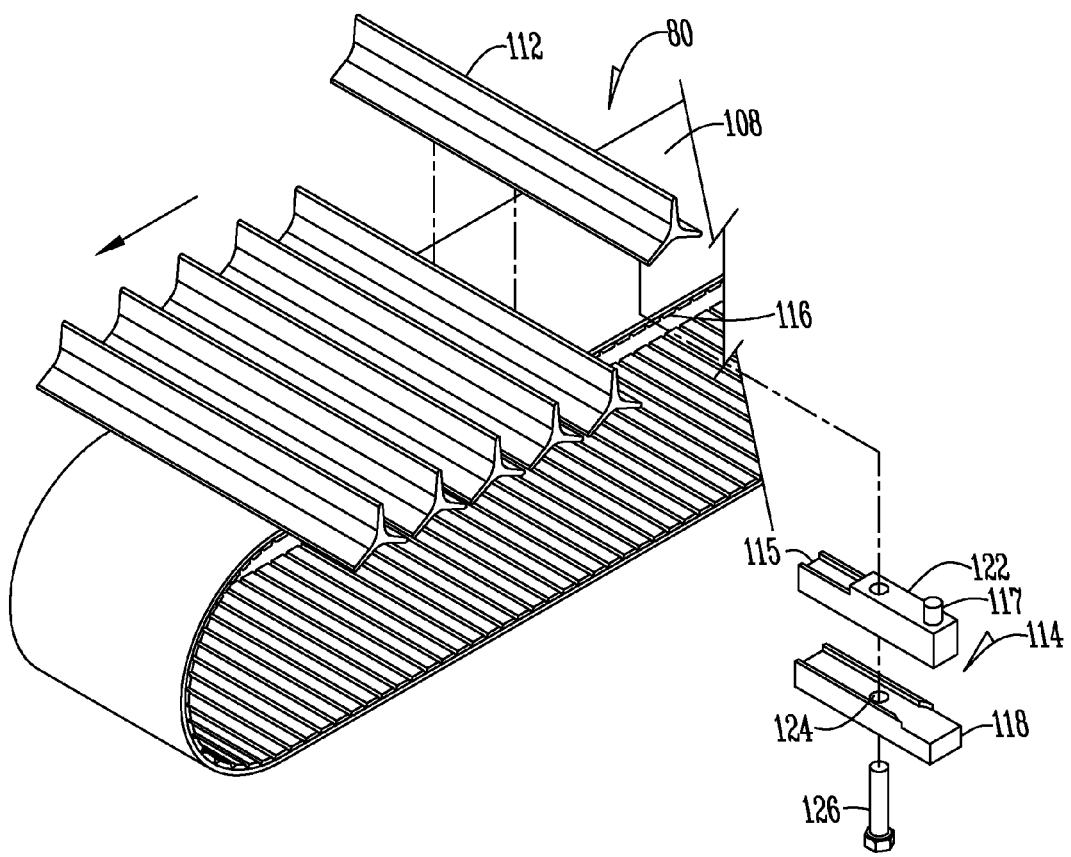
FIG. 7 is an exploded perspective view of a discharge conveyor.

Supported by the frame is a transport conveyor 28 that has an input conveying belt 30 and an output conveying belt 32 that run parallel to one another the length of frame 18 from a first location 14 to a second location 16. Preferably the input 30 and output 32 conveying belts fully cradle the food product 12 to ensure that the food product 12 does not drag on stationary parts or bounce over the side of belts 30 and 32. The input and output conveying belts 30 and 32 are operated by separate drives 34 and 36. Preferably drives 34 and 36 are servo drives to provide precise motion. The separate drives 34 and 36 allow for variation of the speed differential between conveyor belts 30 and 32 which allow for adjustments to the conveying system 10 functions and operation. The separate drives 34 and 36 also allow for the output conveyor belt 32 to run faster or slower than the input conveyor belt 30. The input belt 30 and output belt 32 are adjacent to one another and have conveying surfaces 38 that receive and hold in place food products 12. In one example, the conveying surface 38 as best shown in FIGS. 5 and 6 has a groove 39 in the center that assists in aligning the food product 12 on the conveying surface 38.

A plurality of displacement members 40 are secured to the frame 18 and extend in spaced apart relation from a first end 42 of the frame 18 to a second end 44 of the frame 18. Each displacement member 40 is located adjacent the input conveyors 30 such that when actuated the displacement member 40 can move a food product 12 from an input conveyor 30 to an output conveyor 32. Each displacement member 40 is placed at a predetermined location along the frame 18 and spaced apart from one another. Further, each displacement member 40 is connected to an actuating member 46 such as a valve so that each displacement member 40 is independently operated to move food product 12 from the input conveyor 30 to the output conveyor 32. In one embodiment, each displacement member 40 is a nozzle that utilizes air from an air source 48 that has filters to blow the food product 12 from the input conveyor belt 30 to the output conveyor belt 32. Alternatively, any fluid source mechanism could physically push the food product 12, or another type of displacement member 40 could be utilized without falling outside the scope of the present disclosure. Each module 22, 24 and 26 of the frame 18 includes several displacement members 40. The more displacement members in a configuration of the conveyor system 10, the more capability the conveyor system 10 has. A sufficient space is provided from the last displacement member 40 to the end of the output conveyor belt 32 to allow sufficient time for the food product 12 to settle upon the transport conveyor belt 32.

Sensor elements 50 are located adjacent the first end 42 of the frame 18 and adjacent the input conveyor belt 30. The sensor elements 50 detect the presence of the food product 12 and send an electronic signal to the control unit 20 to determine the position of the food product 12. The position of the sensor 50 is such that sufficient distance from the first end 42 and the sensor 50 is provided to allow the food product 12 time to settle onto the input conveyor belt 30. The position of a steadily transported sausage can be determined more accurately than a food product 12 that is jostled or has relative movement on the input conveyor belt 30.

Figure 4:
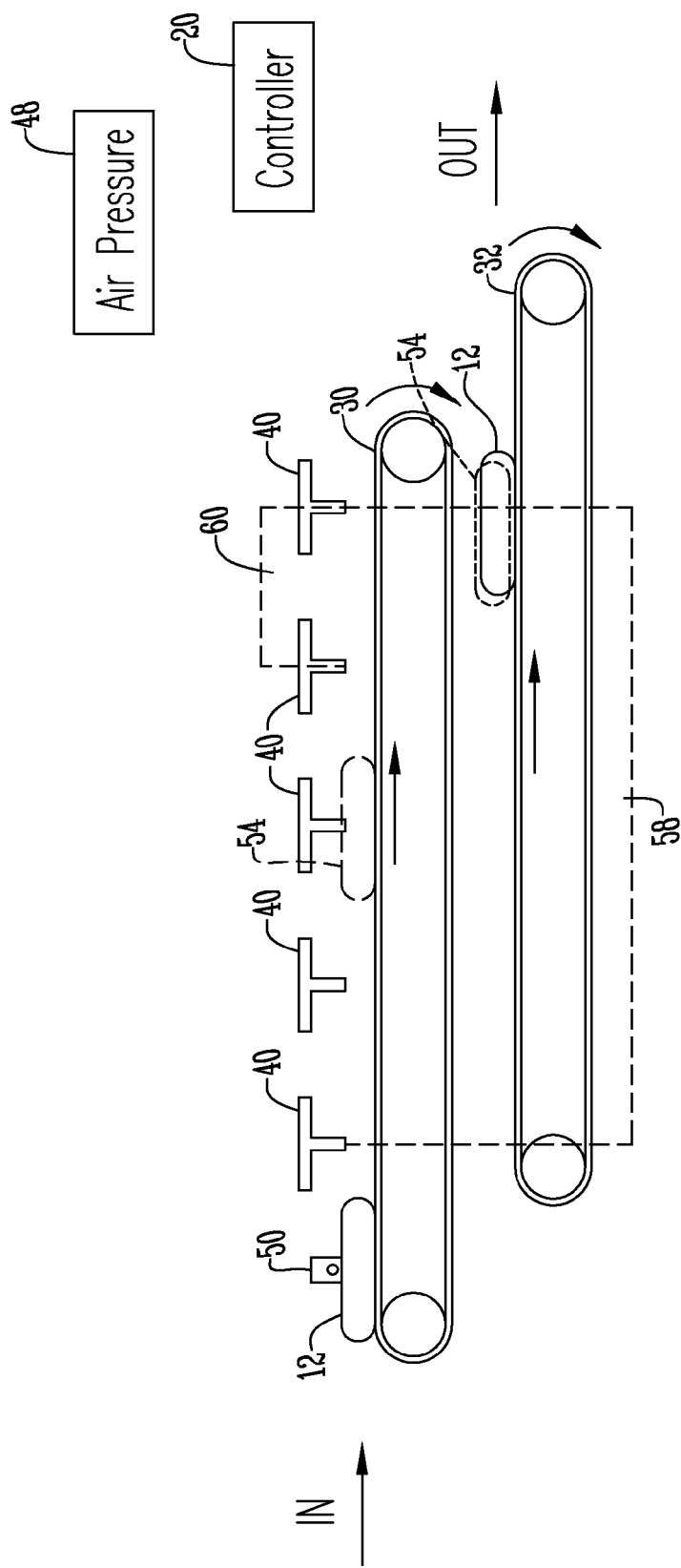
FIG. 4 is a side view of a transport conveyor system.

In operation, as shown by example in FIG. 4, the controller 20 determines a theoretical position 54 for the ideal transfer of a food product 12 from the input conveyor belt 30 to the output conveyor belt 32. The first food product 12 of a conveying operation is transferred by a displacement member 40 in an array of displacement members. The theoretical position 54 for the next food product 12 is determined based upon the length of the food product 54, the speed of the input conveyor belt 30, the speed differential between the input conveyor belt 30 and the output conveyor belt 32, and the relative position of the previous link. As a food product 12 passes and is detected by sensor 50, the sensor sends a signal to the controller 20, which compares the actual detected position of the food product 12 with the theoretical position 54, and based upon the comparison, the controller determines if the next food product 12 is advanced of the theoretical position 54, or retarded of the theoretical position. If the next food product 12 is retarded, the controller sends a signal to an earlier or upstream displacement member 40 when the input conveyor belt 30 is running slower than the output conveyor 32 (i.e., a positive speed differential) which activates the displacement member to transfer the food product 12 from the input conveyor belt 30 to the output conveyor belt 32. When the input conveyor belt 30 is running faster than the output conveyor belt 32, (i.e., a negative speed differential) and the next food product 12 is retarded, then the controller sends a signal to a later or downstream displacement member 40 to activate the displacement member 40 to transfer the food product 12 from the input conveyor belt 30 to the output conveyor belt 32. If the detected position of the food product 12 is advanced of the theoretical position 54, then a signal is sent from the controller 20 to an earlier displacement member 40 when there is a negative speed differential and a later displacement member when there is a positive speed differential.

The maximum position correction for a food product 12 depends upon the length of a transfer zone 58 which is defined as the area from the center of the first displacement member 40 to the center of the last displacement member, and the speed differential between the input and output conveyor belts 30 and 32. The transfer zone 58 is variable in length based upon the addition or removal of frame modules 26 as is the speed differential. Therefore, the maximum position correction may be increased or decreased as desired. As an example, with a 3500 mm long transfer zone 58 and a 10% speed differential, the maximum (unilateral) correction is 350 mm. With a 2500 mm long transfer zone and a 15% speed differential the maximum correction is 375 mm.

The resolution 60 is the window surrounding the theoretically correct position into which a food product 12 can be positioned which depends on the distance between adjacent displacement members 40 and the speed differential. The resolution can be decreased further with a smaller speed differential. For example, where adjacent displacement members 40 are separated by 250 mm and the speed differential is 10%, the resolution is 25 mm or +/−12.5 mm.

As shown in FIGS. 5 and 6, the output conveyor belt 32 of the conveyor system 10 transfers the food products 12 from an in-line arrangement to a side-by-side arrangement using transfer device 62. The output conveyor belt 32 may terminate or may continue past the transfer device 62. The transfer device 62 has a controller 64 that is mounted in a fashion that allows it to be adjusted along the output conveyor belt 32 and supported by a frame module. Preferably, the position of the transfer device 62 is adjusted automatically by the controller 64 or alternatively may be manually adjusted by an operator using a hand crank 67 or other mechanism operatively connected to a track 66. The controller 64 has a processor 68 that operates software. Mounted to the controller 64 is a sensor 70 that is positioned adjacent the output conveyor belt 32 such that the sensor 70 detects the presence of a food product 12. Also mounted to the controller 64 and positioned adjacent the output conveyor belt 32, is a fluid nozzle 72 having a plurality of openings 74. The fluid nozzle 72 is connected to a control valve 76. Both the sensor 70 and the control valve 76 are electrically connected to the controller 64.

Figure 8:
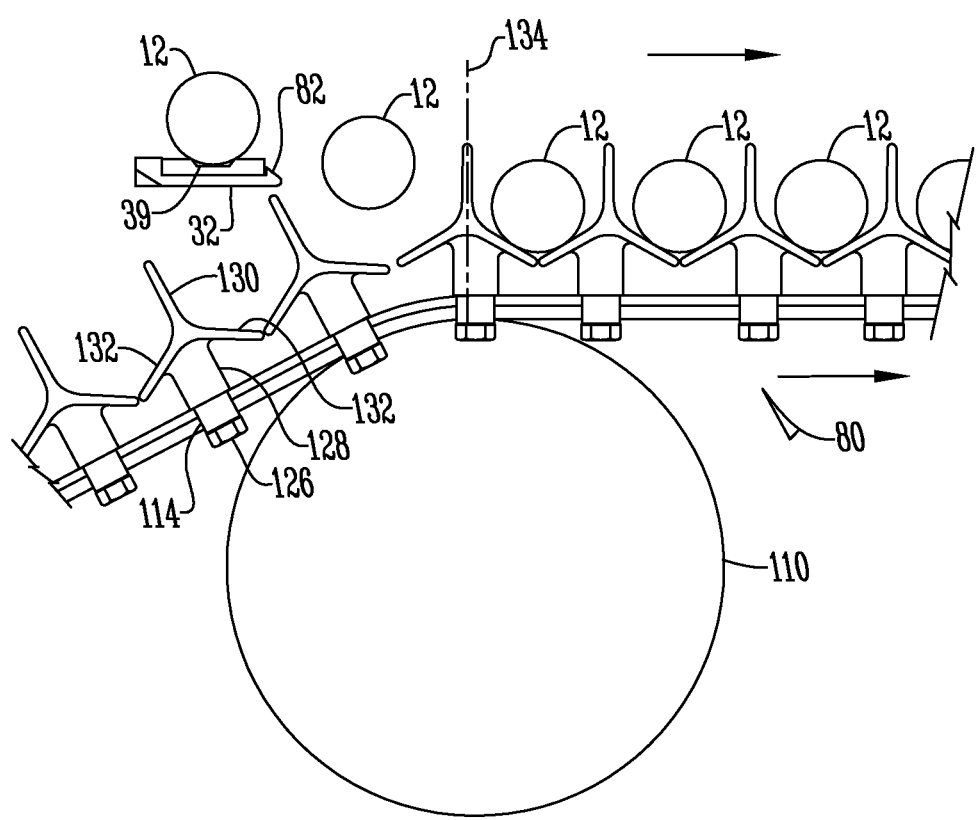
FIG. 8 is a side view of a portion of a transfer device and a discharge conveyor.
Figure 9:
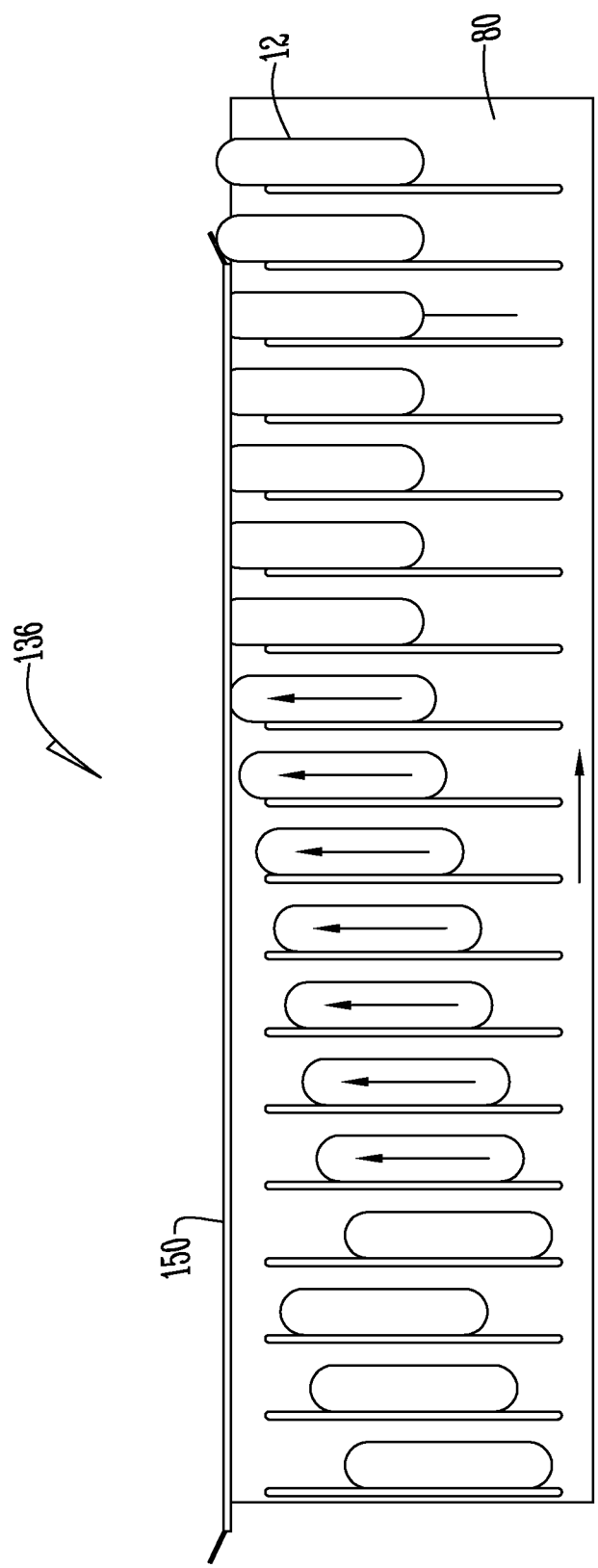
FIG. 9 is a top plan view of a discharge conveyor with a vibrating device.

In operation, when the sensor 70 detects the presence of a food product 12 a signal is sent to the controller 64. Based upon the signal from the sensor 70, the controller 64 sends a signal that opens the control valve 76 which permits compressed air to flow from the fluid source 78, through the valve and out through the openings 74 such that the air fluid forces the food product 12 off of the output conveyor belt 32 and onto an adjacent discharge conveyor 80. To aid in the transfer, as best shown in FIG. 8, a cut out 82 of a shoulder of the output conveyor belt 32 is made at the transfer point 83. Also to aid in the transfer, the height of the transfer device 62 is set so that the openings in the valve 76 contact the food product 12 above the center of gravity of the food product 12. Contacting the food product 12 in this manner introduces a moment to the food product 12 thus causing it to roll (in a controlled motion) instead of launch. This rolling action assists in maintaining the parallelism of the product 12 to the discharge conveyor's 80 flights. Also by contacting the product 12 at a higher location allows a smaller force to be used in the movement of the product 12. This reduction in force allows the product 12 to be more controlled in its movement. The belt 32 contains a shape that allows the product 12 to position itself in the center of the belt 32. This position allows the transfer device 62 to perform consistently. The position, timing, duration, and force of fluid is operated by the controller 64 based in part upon the diameter, length and mass of the food product 12 as well as the speed of the output conveyor belt 32 and the discharge conveyor 80. Alternatively, the controller 64 may allow links 12 to bypass the transfer point 83 as desired. Alternatively a mechanical device may be used for transferring in place of fluid nozzle.

Positioned at the end of the output conveyor belt 32 and adjacent the discharge conveyor 80 is a backboard 84. The backboard 84 assists in controlling the food product 12 as the food product 12 is moved by the transfer device 64 from the output conveyor belt 32 to the discharge conveyor 80. The backboard 80 stops transferred links 12 from continuing in their original direction of travel further than desired. It also dampens the force of impact of the food product, so that it is not damaged and does not bounce back further than desired. The amount of dampening can be adjusted to match the characteristics of a specific food product 12. Small, lightweight links require less dampening than larger, heavier links. Physical stops 98 are used to prevent the backstop form traveling further than desired.

The discharge conveyor 80 is transverse or perpendicular to the transfer device 64 and the output conveyor belt 32 and includes a belt 108 mounted about a plurality of pulleys 110. The discharge conveyor is generally flat using pulleys and/or guides 110 or from a side view triangular as shown in FIG. 5. A plurality of flights 112 are connected to the belt 108 using clips 114. The clips have a groove 115 that matches the profile of the drive tooth 116 of the timing belt 108 and a pin 117 or similar feature that locates the groove 115 with respect to the flight 112. Additionally, a second clip 118 may be added as desired to guide the belt assembly in complex belt paths or to support the belt assembly without damaging the flights 112 or by adding a feature to the first clip. The position of a pair of clips 114, 118 on opposite sides of the belt 108, each with a groove 115 for the drive tooth 116, holds the position of the belt 108 as well as its orientation perpendicular to the belt with a relatively high accuracy. The clips 114, 118 allow the attachment of the special flights 112 to a standard, commonly available, and inexpensive timing belt 108 using standard, commonly available, and inexpensive fasteners 126. Additionally, the bolted on flights 112 may be replaced quickly and easily if damaged. Monolithic belts with integral flights commonly used in similar applications require replacement of the entire belt when damaged at significant cost and lost production time.

Preferably, the flights 112, as shown in FIG. 8 have a base 128, a first or primary finger 130 and a pair of base or secondary fingers 132. The primary finger 130 extends generally in a perpendicular direction from the belt 108. The base 128 is offset in relation to a vertical plane 134 of the primary finger 130. When attached to the belt 108, a pair of flights 112 are positioned to mirror one another such that when viewing from a side profile, the base 128 on the flight 112 to the left would be offset to the left in relation to the primary finger's 130 vertical plane 134 and the base 128 of the flight 112 to the right would be offset to the right in relation to the primary finger's 130 vertical plane 134. As a result of the offset between the base 128 of the flight 112 and the primary finger 130, the flight can be attached opposite standard pitch timing belt drive teeth with a flight pitch that is not evenly divisible by the tooth pitch.

As a result of the belt path, flights 112 rotate about an arcuate section of the belt 108 where food products 12 are transferred from the output conveyor 32 to the discharge conveyor 80, the primary fingers 130 of adjacent flights 112 separate to provide a wider opening to receive the food product 12. As the flights 112 move past the arcuate section to a more straight section the primary fingers 130 of adjacent flights 112 are drawn together causing the food product 12 to be captured in a pocket between adjacent primary fingers 130 and come to rest centered on the secondary fingers 132 in a predictable and consistent location. The flight 112 opening can be advanced or retarded on its timing to the output of the transfer unit belt 32. This advancing or retarding can be controlled by the control unit or an operator. Its purpose is to allow the maximum amount of time for the food product 12 to transfer. Maximizing the size of opening allows for a greater product position tolerance on the output belt 32 of the transfer unit 62.

The product 12 position tolerance has also been affected by the design height of the flight. The flight 112 height directly affects the opening size at the discharge conveyor 80. This opening size directly affects the food products 12 allowable positional tolerance on the exit of the transfer unit 62. Thus a larger flight 112 height at a given angle equals a greater opening size which in turn equals a greater food product 12 positional tolerance at the transfer unit 62. The complexity of the belt path has ensured that this flight 112 opening occurs at the peak of the pulley and that the closing of the flight 112 occurs after the product 12 has transferred. This opening and closing of the flights 112 has also allowed the food product 12 to be positioned closer together for presentation to the loading section. In the case that a robot is used it maximizes the amount of food product 12 that can be picked while minimizing the amount of moves for the robot.

In turn the combination of the adjusted positioning of products, the belt path, the flight height, the flight shape, the opening angle of the flights, the phasing of the discharge conveyor 80, and the use of a non-mechanical transfer have made it possible to transfer sausages without using a buffering system.

A vibrating device 136 has a vibrating frame member 138. Pivotally connected at a pivot point 140 is a support frame member 142. The vibrating frame member 138 extends from the pivot point 140, across the support frame member 142. The vibrating device 136 is self-contained within the width of the discharge conveyor 80.

The vibrating frame member 138 has at least a pair of openings that receive a pair of bowed guide members 148 that support the conveyor 80. Openings 146 are used for removal of bowed guide members 148. Connected to the vibrating frame member 138, adjacent the pivot point 140 is a reference edge 150. The reference edge 150 provides a stop to aid in aligning food product 12. Specifically, the reference edge 150 can be stationary, vibrating or traveling with the conveyor belt 80.

Movement of the vibrating frame member 138 is initiated and controlled by a drive member 152. The drive member includes a drive motor 154 having an eccentric drive shaft 156 extending therefrom. The eccentric drive shaft 156 transforms rotation into a reciprocating generally up and down motion of the vibrating frame 138. In addition to this, the speed of rotation and the belt tension can affect vibration. The drive shaft 156 extends through a pivot 160 that is connected to the vibrating member 138.

In operation, food product 12 is deposited on the flighted belt 80 for transport to a packaging station (not shown). As the product reaches a vibration zone the product is aligned against the reference edge 150. Alignment occurs as a result of vibration of the product 12 while being transported along the flighted conveyor belt. Vibration is created through a combination of the drive member 152, the vibrating frame member 138, and the bowed guide members 148. A controller (not shown) activates the drive motor 154 that in turn rotates the drive shaft 156. As the drive shaft 156 rotates, the eccentric shape of shaft 156 moves up and down engaging pivot 160. The engagement of drive shaft 156 with pivot 160 causes the vibrating frame member 138 to pivot about pivot point 140. As the vibrating frame member 138 pivots it engages conveyor belt 80 lifting a portion of the belt 80 supported by the bowed guide members 148. As a result only this portion of the conveyor belt vibrates to align the food product.

When belt 80 is lifted by the vibrating action, the tension in the belt 80 will cause the belt 80 to fall faster than gravity. As the belt 80 falls faster than gravity, separation between the belt 80 and the food product 12 occurs. With the vibrating action of the vibrating frame member 138 about pivot point 140 being an upward/sideways movement, the food product 12 moves axially on the conveyor and transverse to the direction of flow of the conveyor belt 80.

The pivot point 140 is located such that the bowed guide member 148 nearest the reference edge 150 moves downward slightly while the opposite bowed guide member 148 moves upward. This assists in creating separation between the product 12 and the belt as well as aiding in the axial motion of the product.

One skilled in the art would appreciate that other techniques, such as the use of a hold down device that would keep the belt 80 in contact with the vibrating frame member 138 could be used. Also, it should be understood that the conveyor 80 could be used with a product 12 of any shape, with or without flights.

What is claimed is:

1. A system for transporting food product for packaging, comprising:
   a transport conveyor operatively mounted to a frame and having an input conveying belt with a first drive and an output conveying belt with a second drive;
   a plurality of displacement members secured to the frame and positioned adjacent the input conveyor belt, wherein the displacement members are nozzles that utilize fluid to transfer the food products from the input conveying belt to the output conveying belt;
   a sensor located adjacent a first end of the frame and the input conveyor;
   a controller connected to the first and second drives, the displacement members, and the sensor wherein the controller activates a selected displacement member based upon a sensed position of the food product as compared to a determined theoretical position of the food product to transfer the food product from the input conveying belt to the output conveying belt; and
   a transfer device positioned adjacent the output conveying belt for transferring food product from the output conveying belt to a discharge conveyor so that the food product is arranged in side-by-side alignment.

2. The system of claim 1 wherein there is more than one input and output conveying belt.

3. The system of claim 1 wherein a transfer device has a controller, a sensor, and a displacement member wherein upon detection of the food product by the sensor the controller activates the displacement member such that the displacement member transfers the food product from the output conveying belt to the discharge conveyor.

4. The system of claim 3 wherein a fluid nozzle is a displacement member adjustably mounted to a frame of a transfer conveyor system.

5. The system of claim 1 wherein the geometry of the conveying surfaces of the input and output conveying belts center the food product.

6. The system of claim 3 wherein the controller determines the position, timing, duration and/or force of fluid from a nozzle upon activation.

7. The system of claim 3 further comprising a backboard positioned adjacent the discharge conveyor for assisting in controlling the food product.

8. The system of claim 1 wherein the discharge conveyor has a plurality of flights having a base, a primary finger and a pair of secondary fingers mounted to a belt.

9. The system of claim 8 wherein the plurality of flights are connected to the belt using clips having a groove profile that matches a profile of a drive tooth and connects the flight to the belt at a predetermined position and a second clip is used to guide a belt in a predetermined path.

10. The system of claim 8 wherein the base of the flight is offset in relation to a vertical plane of the primary finger.

11. The system of claim 8 wherein as the flights rotate about an arcuate section of the belt the primary fingers of adjacent flights separate to provide a wider opening and are drawn together when the flights move over a more straight section of the belt.

12. The system of claim 8 wherein a vibrating device is used to oscillate the discharge conveyor belt for the purpose of aligning products being conveyed.

13. A method of transferring food product for packaging comprising the steps of:
   determining a theoretical position of a food product on an input conveying belt of a transfer conveyor using a controller based upon a sensed position of the food product;
   activating with the controller a selected displacement member based on a comparison of the determined theoretical position and the sensed position to transfer the food product from the input conveyor belt to an output conveyor belt; and
   transferring the food product from the output conveying belt to a discharge conveyor using a transfer device.

14. A system for transporting food product for packaging, comprising:
- a transport conveyor operatively mounted to a frame and having an input conveying belt with a first drive and an output conveying belt with a second drive;
- a plurality of displacement members secured to the frame and positioned adjacent the input conveyor belt;
- a sensor located adjacent a first end of the frame and the input conveyor;
- a controller connected to the first and second drives, the displacement members, and the sensor wherein the controller activates a selected displacement member based upon a sensed position of the food product as compared to a determined theoretical position of the food product to transfer the food product from the input conveying belt to the output conveying belt;
- a transfer device positioned adjacent the output conveying belt for transferring food product from the output conveying belt to a discharge conveyor so that the food product is arranged in side-by-side alignment; and
- wherein the displacement members are nozzles that utilize fluid to transfer the food products from the input conveying belt to the output conveying belt.

\* \* \* \* \*